US012739325B2

(12) United States Patent
Cheng et al.

(10) Patent No.: US 12,739,325 B2
(45) Date of Patent: Sep. 15, 2026

(54) SYSTEMS AND METHODS FOR EMULATING A SHARED LINE SYSTEM IN A MULTICELL NETWORK

(71) Applicant: VTech Telecommunications Limited, Hong Kong (CN)

(72) Inventors: Bennett Cheng, Vancouver (CA); Gary Louie, Vancouver (CA); Kar She Chan, Hong Kong (CN); Chung Shing Lam, Hong Kong (CN)

(73) Assignee: VTECH TELECOMMUNICATIONS LIMITED, Hong Kong (CN)

( * ) Notice: Subject to any disclaimer, the term of this patent is extended or adjusted under 35 U.S.C. 154(b) by 301 days.

(21) Appl. No.: 18/539,134

(22) Filed: Dec. 13, 2023

(65) Prior Publication Data

US 2025/0203014 A1 Jun. 19, 2025

(51) Int. Cl.
*H04M 7/00* (2006.01)
*H04W 4/06* (2009.01)
*H04W 4/16* (2009.01)

(52) U.S. Cl.
CPC ............. *H04M 7/009* (2013.01); *H04W 4/06* (2013.01); *H04W 4/16* (2013.01)

(58) Field of Classification Search
CPC .......... H04M 7/009; H04W 4/06; H04W 4/16
USPC .......................................................... 455/524
See application file for complete search history.

(56) References Cited

U.S. PATENT DOCUMENTS

2002/0090961 A1* 7/2002 Walley .................... H04M 1/65 455/554.1
2004/0009749 A1* 1/2004 Arazi .................... H04W 36/08 455/41.2
2005/0276237 A1 12/2005 Segal et al.
2006/0007930 A1 1/2006 Dorenbosch
(Continued)

FOREIGN PATENT DOCUMENTS

DE 19937508 A1 * 3/2001 .......... H04W 36/144
WO 2005/081499 A1 9/2005
(Continued)

OTHER PUBLICATIONS

"Digital Enhanced Cordless Telecommunications (DECT); New Generation DECT Phase 1; Part 2: IP Data Service", European H04L Telecommunications Standards Institute (ETSI), Draft ETSI TS 102 527-2 V0.02, Feb. 21, 2007, pp. 1-34.
(Continued)

*Primary Examiner* — Sam K Ahn
(74) *Attorney, Agent, or Firm* — STEPTOE LLP; Carl B. Wischhusen

(57) ABSTRACT

A method for emulating a shared line system in a multicell wireless network. A primary base assigns, to a first call, a call index identifying the first call on a first shared line. The primary base distributes a call record of the first call, including the call index of the first call and a call status of the first call, to at least one secondary base. The method also includes broadcasting, to wireless terminals assigned to the first shared line, the call index of the first call and the call status of the first call. The primary base performs a call operation relating to the first call based on an operation request from one of the wireless terminals assigned to the first shared line. The operation request includes the call index of the first call. Each wireless terminal may display the call index and the call status.

22 Claims, 8 Drawing Sheets

(56) References Cited

U.S. PATENT DOCUMENTS

| | | | | |
|---|---|---|---|---|
| 2006/0072532 | A1 | 4/2006 | Dorenbosch et al. | |
| 2006/0154675 | A1 | 7/2006 | Chapman et al. | |
| 2013/0324112 | A1 | 12/2013 | Jechoux et al. | |
| 2018/0368082 | A1 | 12/2018 | O'Shea et al. | |
| 2024/0073653 | A1* | 2/2024 | Johnson ................ | H04M 3/543 |
| 2025/0088315 | A1 | 3/2025 | Dimou et al. | |

FOREIGN PATENT DOCUMENTS

| | | | |
|---|---|---|---|
| WO | 2019/210082 | A1 | 10/2019 |
| WO | 2023/105292 | A1 | 6/2023 |

OTHER PUBLICATIONS

System Multicell: "Gigaset N720 DECT IP Multicell System, Installation, configuration and operation", Jan. 1, 2015, 139 pages, http://gse.gigaset.com/fileadmin/legacy-assets/CustomerCare/Manuals/PRO/N720_PRO/A31008-M2314-L101-5-7619_en_UK_IE.pdf.

Extended European search report from European Patent Application No. 24217155.1, May 7, 2025, 11 pages.

Extended European search report from European Patent Application No. 24217373.0, May 14, 2025, 10 pages.

Extended European search report from European Patent Application No. 24217218.7, May 16, 2025, 7 pages.

Extended European search report from European Patent Application No. 25150321.5, Jun. 12, 2025, 9 pages.

* cited by examiner

SYSTEMS AND METHODS FOR EMULATING A SHARED LINE SYSTEM IN A MULTICELL NETWORK

BACKGROUND

Technical Field

The present disclosure generally relates to systems and methods for realizing a shared line or key line emulation across a multicell network that includes a primary base station in communication with one or more secondary base stations providing communication among wireless terminals.

Description of the Related Art

A wireless network may include one or more base stations ("bases") in communication with one or more wireless terminals. The wireless base stations are interconnected. In one particular example, a network comprises a primary base station and may include one or more secondary base stations. A number of terminals connect wirelessly to these base stations, with the terminals roaming freely from one base station to another. However, conventional approaches cannot effectively emulate a shared or key line system in a multicell network.

SUMMARY

Disclosed embodiments are directed to systems and methods for realizing a shared line or key line emulation (KLE) across a multicell network that includes a primary base station in communication with one or more secondary base stations providing communication among wireless terminals. In one embodiment, a shared line system is created among the wireless terminals based upon a single incoming line to the multi-base system. In another embodiment, a shared line system is created among the wireless terminals based upon multiple incoming lines to the multi-base system. Other embodiments are described herein.

In an example embodiment, the system utilizes a call indexing procedure to realize a KLE across a multicell network. To effectively emulate a shared line or key line telephony system in a distributed multicell DECT system, for example, it is necessary to be able to identify a shared line call instance. In disclosed embodiments, respective calls are indexed to identify the calls on respective shared lines.

Conventional approaches cannot effectively emulate a shared line system in a multicell network or realize a KLE across a multicell network. For example, conventional approaches do not have a system for indexing a call instance across multiple base stations, and thus conventional approaches cannot identify a shared line call instance, e.g., a call instance associated with a shared VoIP Call Account.

Technical solutions and advantages are realized throughout the application.

By virtue of the features of the embodiments disclosed herein, systems and methods can realize shared line or key line operations across a multicell wireless system having multiple base stations and associated wireless terminals. As an example, an indexing system or method can be realized for identifying a call instance associated with, e.g., a shared SIP/VoIP account, in order to identify a call across the system and enable wireless terminals to transfer, hold, and bridge call instances while still maintaining the essential call information and connection status.

In example embodiments a system or method assigns a call index to a call and distributes the call index across one or more base stations. The call index can be used, for example, to identify an incoming call on a shared line so that any wireless terminal in the system may answer the call. The call index can also be used, for example, by the primary base station to perform call operations relating to the call based on operation requests from wireless terminals assigned to the shared line. The operation requests include the call index. The call index can also be used, for example, to identify a call proxy between base stations for shared line call operations (e.g., hold/unhold, barge—in, transfer, conference, etc.). Other example embodiments are described herein.

In one aspect, the present disclosure is directed to a method for emulating a shared line system in a multi-cell wireless network comprising a primary base station in communication with at least one secondary base station, the network providing communication with wireless terminals. In the method, the primary base station assigns, to a first call, a call index identifying the first call on a first shared line. The primary base station distributes a call record of the first call, including the call index of the first call and a call status of the first call, to the at least one secondary base station. The method also includes broadcasting, to wireless terminals assigned to the first shared line, the call index of the first call and the call status of the first call. The primary base station performs a call operation relating to the first call based on an operation request from one of the wireless terminals assigned to the first shared line. The operation request includes the call index of the first call. Each wireless terminal may display the call index (which may be a value) and the call status.

Embodiments may include one or more of the following features, individually or in combination.

The method may further include establishing, when the first call is active with a wireless terminal localized to the at least one secondary base station, a call proxy between the primary base station and the at least one secondary base station, and matching the call proxy with the first call based at least in part on the call index of the first call.

The method may further include: assigning, by the primary base station, to a second call, a call index identifying the second call on a second shared line; distributing, by the primary base station, a call record of the second call, including the call index of the second call and a call status of the second call, to the at least one secondary base station; broadcasting, to the wireless terminals assigned to the second shared line, the call index of the second call and the call status of the second call; and performing a call operation, by the primary base station, based on an operation request relating to the second call, from one of the wireless terminals assigned to the second shared line. The operation request includes the call index of the second call.

The method may further include establishing call proxies when the first call and the second call are active with wireless terminals localized to the at least one secondary base station. The call proxies may comprise a call proxy between the primary base station and the at least one secondary base station for the first call, and a call proxy between the primary base station and the at least one secondary base station for the second call. The call proxies are matched with the first call and the second call based at least in part on the call index of the first call and the call index of the second call, respectively.

Figure 1:
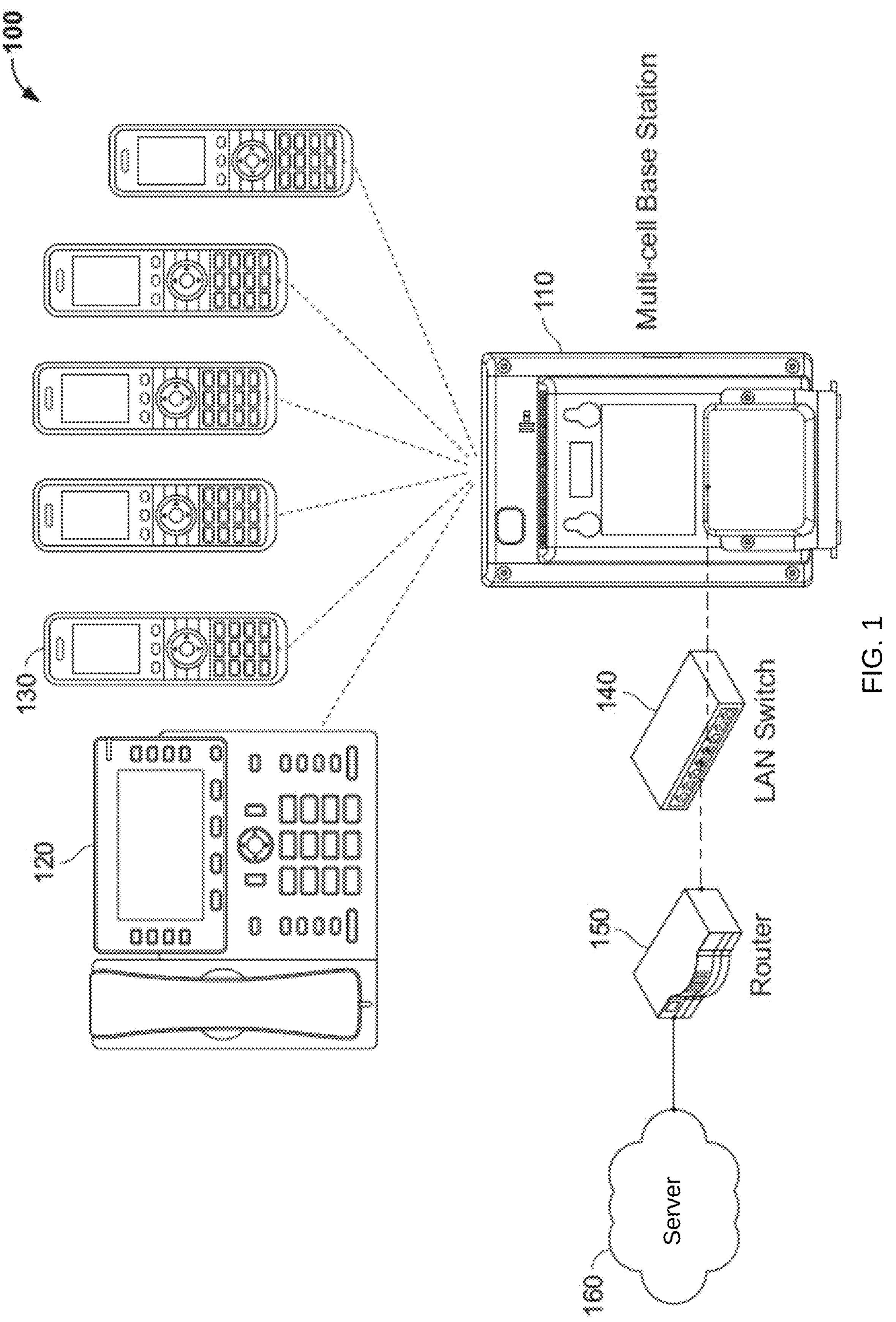
FIG. 1 depicts a set of equipment for a Digital Enhanced Cordless Telecommunications (DECT) system including a multicell base station and a number of wireless terminals.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the present teachings. However, it will be understood by those of ordinary skill in the art that the presently taught approaches and the example embodiments provided herein may be practiced without these specific details. In other instances, well-known methods, procedures, components, and circuits have not been described in detail so as not to obscure the presently taught approaches and techniques.

A Digital Enhanced Cordless Telecommunications (DECT) system includes a multicell base station and a number of wireless terminals. The DECT standard provides for a portable handset to wirelessly connect and communicate with a base, and the base may then connect to and communicate with a communication system or network, such as the public switched telephone network ("PSTN"), a Voice Over Internet Protocol ("VoIP") connection, or a) private branch exchange ("PBX"). For example, the base may communicate with an IP-based PBX using Session Initiation Protocol ("SIP") and Real-Time Transmission Protocol ("RTP") protocols, and the base may connect to an IP-based PBX via a local area network ("LAN") using, e.g., a Wi-Fi connection or an Ethernet connection. In one example, the base may connect to and communicate through one or more lines. It is noted that references to a "line" herein should be understood to encompass any telecommunications line or channel for transmitting communications (e.g., voice, text, or data communications), such as a physical or hardwired phone line (e.g., cable or fiber optic), a wireless or digital line, a line via the internet (e.g., a VoIP line), a line instance (e.g., a VoIP line instance), or a phone number or extension.) For example, the base may connect to and communicate through one or more VoIP lines, where each VoIP line includes multiple line instances such that the base can provide for two or more handsets localized to the base to each simultaneously engage in a separate session (e.g., call) on a separate line instance.

In a shared line telephony system, multiple telephone handsets or desk sets share the same phone line and phone number. Only one external call can be made or received at a time on the shared line, although internal calling between extensions is usually possible. The term "key line" refers to a specific type of shared line telephony system, often associated with key telephone systems (KTS). In a key system, each phone has multiple buttons (or "keys") that correspond to different lines or extensions. A user can pick up a call on any line by pressing the associated button. Accordingly, in key line systems users have direct control and visibility over multiple lines and can easily switch between them, in contrast to shared line systems in which all extensions share a single line and have equal access to it. These systems are commonly used for example in business environments to enhance communication and collaboration among team members. These systems are also commonly used in other environments such as home environments.

Key line emulation (KLE) capabilities may include a first handset's ability to monitor the status of one or more shared lines or line instances (e.g., VoIP line instances shared among multiple DECT handsets), wherein one or more indicators on the first handset show the status of the one or more monitored line instances, one or more keys on the first handset allow the first handset to engage with the one or more line instances (e.g., to make, receive, hold, or barge in on a call on a shared line instance), and a configuration tool or process through which the first handset is configured to monitor and engage with the one or more monitored line instances.

FIG. 1 depicts a set of equipment 100 for a Digital Enhanced Cordless Telecommunications (DECT) system including a multicell base station 110 and a number of wireless terminals (120, 130). In the example depicted in FIG. 1, the base station 110 is set up to communicate with a cordless deskset 120 and a number of cordless handsets 130. In some cases, the base station 110 may be connected to a local area network (LAN) switch 140, which is in communication with a router 150. The router 150, in turn, is connected to an end or external server, such as a hosted Internet Protocol (IP) private branch exchange (PBX) 160 which provides access to the public switched telephone network. In embodiments, there are multiple base stations 110 and wireless communication terminals (120, 130). The wireless terminals (120, 130) may roam among base stations 110 during operation.

Figure 2:
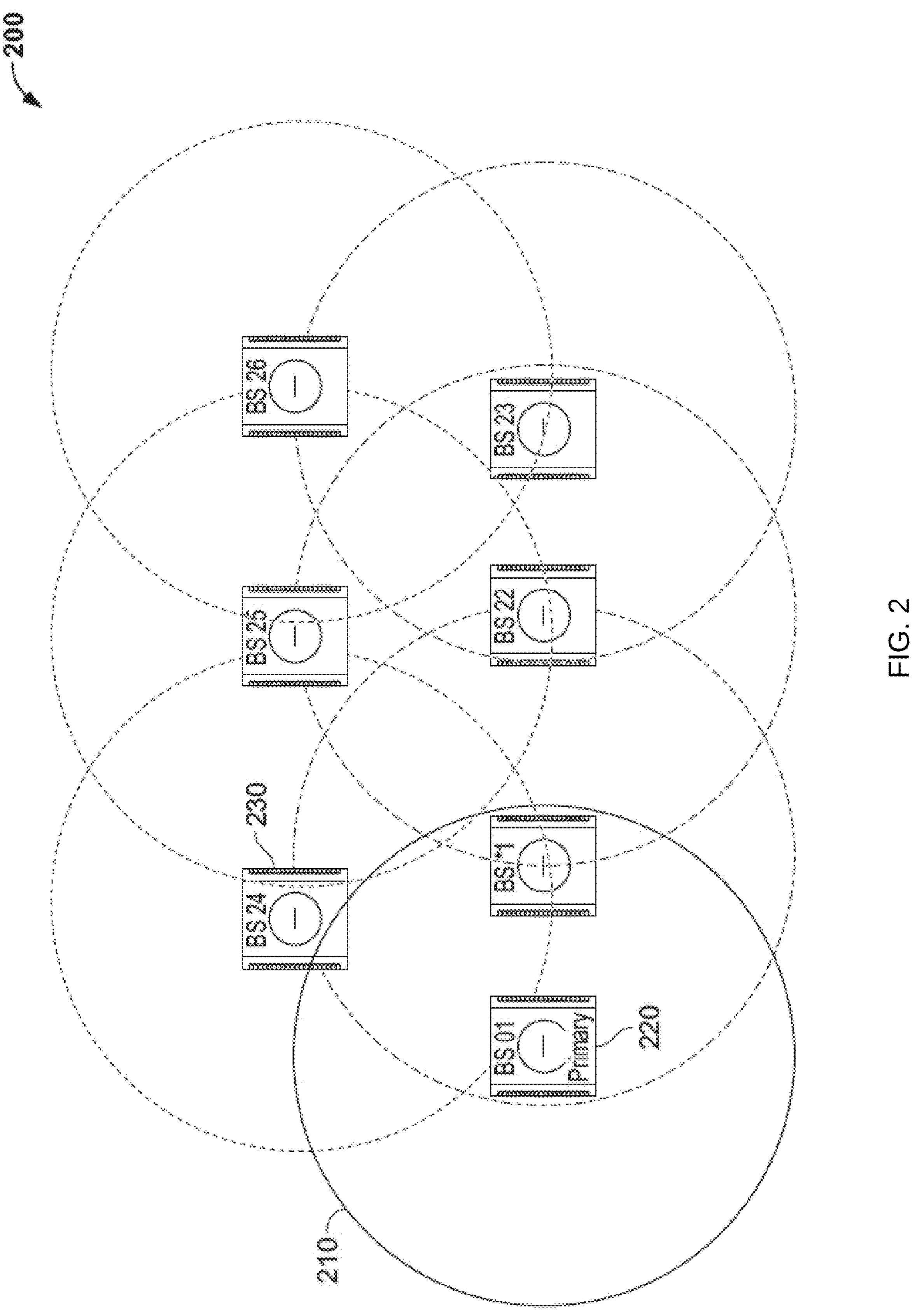
FIG. 2 depicts a primary base station and a number of secondary base stations of a DECT multicell system, each of which is responsible for communicating with wireless terminals.

FIG. 2 depicts a primary base station 220 and a number of secondary base stations 230 of a DECT multicell system 200, each of which is responsible for communicating with wireless terminals, e.g., cordless handsets 130 (see FIG. 1), within a specific area or "cell" 210. Each cell 210 overlaps with the neighboring cells to ensure there are no gaps in coverage. When a handset 130 is first used in the system 200, it is registered with the base stations (220, 230), which record its unique ID. Generally, when the handset 130 makes a call, the closest base station (220, 230) sets up the call, i.e., the base station (220, 230) to which the handset 130 is "localized." This process is facilitated through a frequency/ time slot pattern, with each base station (220, 230) and handset pairing given a unique pattern to avoid interference. As a handset 130 moves from the coverage area, i.e., cell 210, of one base station (220, 230) to another, the system performs a handover. This involves the base station with a weakening signal handing over the connection to the base station where the signal is getting stronger. This process is seamless to the user, who does not experience any interruption in their call.

DECT uses Time Division Multiple Access (TDMA) to allow multiple handsets to communicate with the base station simultaneously. It divides the communication channel into multiple time slots, and each handset is assigned a specific time slot in which to transmit and receive information. DECT systems use encryption to secure the communications between the handsets and base stations. The DECT standard specifies the use of the DECT Standard Authentication Algorithm (DSAA) for authentication and the DECT Standard Cipher (DSC) for encryption.

Figure 3:
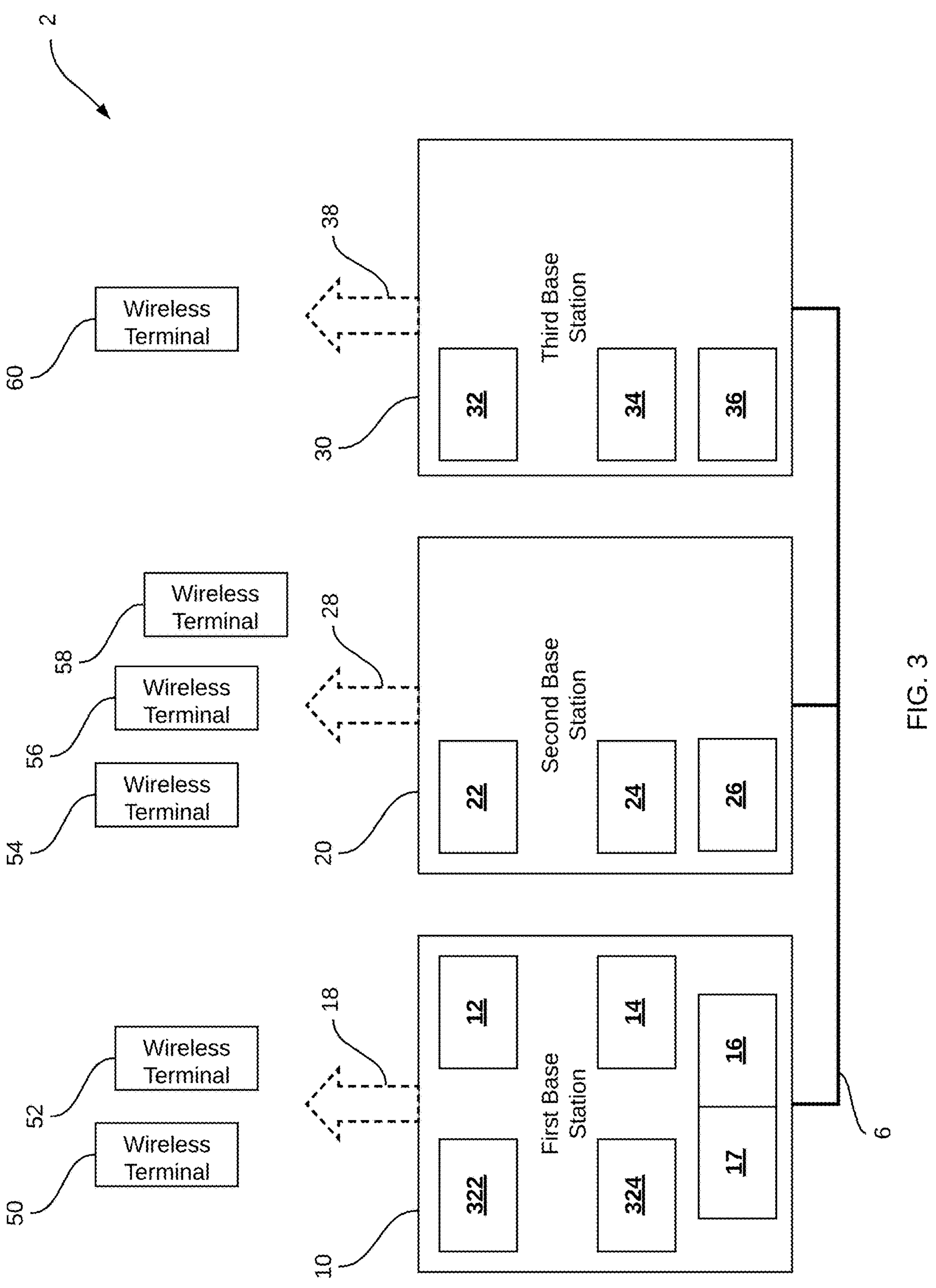
FIG. 3 depicts a schematic system diagram of an exemplary multi-cell DECT system, the system adapted for realizing a shared line or key line emulation (KLE), according to an embodiment of the present disclosure.

FIG. 3 shows a schematic system diagram of an exemplary multi-cell DECT system 2, the system adapted for effectively realizing a shared line or key line emulation (KLE), according to an embodiment of the present disclosure. Multi-cell DECT system 2 includes first base 10, second base 20, and third base 30, which are connected via a communication network 6. In one embodiment, communication network 6 can be a LAN and first, second, and third bases 10, 20, 30 can be connected to network 6 via a Wi-Fi or Ethernet connection. In one embodiment, communication network 6 can be an IP-based PBX.

In an embodiment, the bases of the multi-cell DECT system 2 may include a primary base and one or more secondary bases. In one example, first base 10 of multi-cell DECT system 2 may be a primary base, and second and third bases 20, 30 may be secondary bases. In one embodiment, a multi-cell DECT system 2 connects to and communicates with an external communication system or network via the primary base. For example, one or more shared VoIP lines or line instances may connect to and communicate through a primary base, such that communication with a secondary base over a shared line or line instance is performed or routed through the primary base.

Multi-cell DECT system 2 includes a plurality of portable handsets 50, 52, 54, 56, 58, 60. FIG. 1 shows first and second handsets 50, 52 localized to first base 10; third, fourth, and fifth handsets 54, 56, 58 localized to second base 20; and sixth handset 60 localized to third base 30. Each of these handsets is wireless and portable and may be moved to become localized to another base, via a handoff.

In one embodiment, first, second, and third bases 10, 20, 30 of multi-cell DECT system 2 include first, second, and third status databases 12, 22, 32, respectively. Together, first, second, and third status databases 12, 22, 32 collectively form a distributed or decentralized status database. For example, each base in the multi-cell DECT system 2 may include and maintain a copy of the distributed status database. The distributed status database made up of first, second, and third status databases 12, 22, 32 may be updated, synchronized, and maintained using replication or duplication.

The status database may store and share status information across the system in real-time, such as handset locations, handset statuses, shared line instance statuses, or changes to any such information. Handset location information may include, for example, that first handset 50 is localized to first base 10. Handset location information may be used, for example, to route calls through multi-cell DECT system 2. Handset status information may be used for busy monitoring ("BM") capabilities and may include, for example, that handset 50 has one of the following statuses: not in use, such as idle; in use, such as on a call, on hold, ringing, or dialing; do not disturb; low battery; powered off; out of range of a base; or another status. Shared line instance status information may be used for KLE capabilities and may include, for example, that a shared line instance has one of the following statuses: not in use, such as idle; in use, such as a call with a handset at issue, a call with another handset, a call that is on hold, ringing from an incoming call, dialing with a handset at issue, dialing with another handset, or a call in which a handset has barged in; or another status.

In one embodiment, status information may be transmitted or broadcast from a base to one or more handsets localized to the base. In one embodiment, status information may be universally relayed from each base in a multi-cell system to each handset localized to that respective base, and the status information may be relayed as a status broadcast, such as via one or more dedicated broadcast channels. FIG. 3 shows first, second, and third bases 10, 20, 30 broadcasting first, second, and third status broadcasts 18, 28, 38, respectively. Together, first, second, and third status broadcasts 18, 28, 38 collectively constitute a universal status broadcast of multi-cell DECT system 2. In one embodiment, the status broadcast is broadcast by two or more bases of the multi-cell DECT system, such as all bases of the system. In one embodiment, each base from which the status broadcast is broadcast may broadcast the same status information or status broadcast. In one embodiment, each base from which the status broadcast is broadcast may broadcast the status broadcast to each handset localized to that respective base.

In one embodiment, first, second, and third bases 10, 20, 30 include first, second, and third configuration databases 14, 24, 34, respectively. Together, first, second, and third configuration databases 14, 24, 34 collectively form a distributed or decentralized configuration database of multi-cell DECT system 2. For example, each base in the multi-cell DECT system may include and maintain a copy of the distributed configuration database. The distributed configuration database made up of first, second, and third configuration databases 14, 24, 34 may be updated, synchronized, and maintained using replication or duplication.

In one embodiment, the configuration database may store configuration information. For example, the configuration database may store and share configuration information across the system in real-time, such as handset configuration information. In one embodiment, configuration information may include SIP configurations, BM configurations, KLE configurations, and/or handset operational and feature configurations (e.g., configurations regarding keys and indicators).

In one embodiment, the configuration database may be used to determine whether a base should broadcast the status broadcast and if so, what status information to include in the status broadcast. For example, for first base 10, BM and KLE configurations stored in first configuration database 14 for first and second handsets 50, 52, which are localized to first base 10, may be analyzed to determine what status information from first status database 12 is relevant and should be included in dynamic first status broadcast 18. First status broadcast 18 may then be updated to include only status information relevant to first and second handsets 50, 52, based on the BM and KLE configurations for those two handsets. In one embodiment, call controls may manage messages transmitted between the bases of a multi-cell DECT system. For example, such messages may contain status information and/or configuration information transmitted to or from a base's status database and/or configuration database, respectively.

In one embodiment, a base of a multi-cell DECT system 2 may include a call control. First, second, and third bases 10, 20, 30 include first, second, and third call controls 16, 26, 36, respectively. In one embodiment, a base's call control may process calls, and related information, sent from or received by the base using SIP and RTP protocols. In one embodiment, call controls of the bases in a multi-cell DECT system manage call routing within the system and external to the system, including when a portable handset on a call is relocated such that the handset is handed off from a first base to a second base. In one embodiment, call controls may manage messages transmitted between the bases of a multi-cell DECT system. For example, such messages may contain status information and/or configuration information transmitted to or from a base's status database and/or configuration database, respectively.

In one embodiment, a multi-cell DECT system may include one or more external call controls. For example, first base 10 of multi-cell DECT system 2 includes external call control 17. In one example, an external call control may be specific to a primary base in a multi-cell DECT system. In one embodiment, an external call control may process and route external calls and related information. In one example, external call control 17 may process and route an external call received by multi-cell DECT system 2 from an external caller, through an external communications system or network, and directed to a handset in system 2, such as third handset 54. In one example, external call control 17 may process and route an external call sent from multi-cell DECT system 2 (e.g., dialed by third handset 54) to an external caller, through an external communications system or network. For example, external call control 17 may be connected to an external line, such as an external VoIP line, via an external connection.

In one embodiment first base 10 includes a call assign module 322 and a call assign database 324 for realizing a shared line or key line emulation (KLE), the details of which are described below in connection with FIGS. 4-6.

Figure 4:
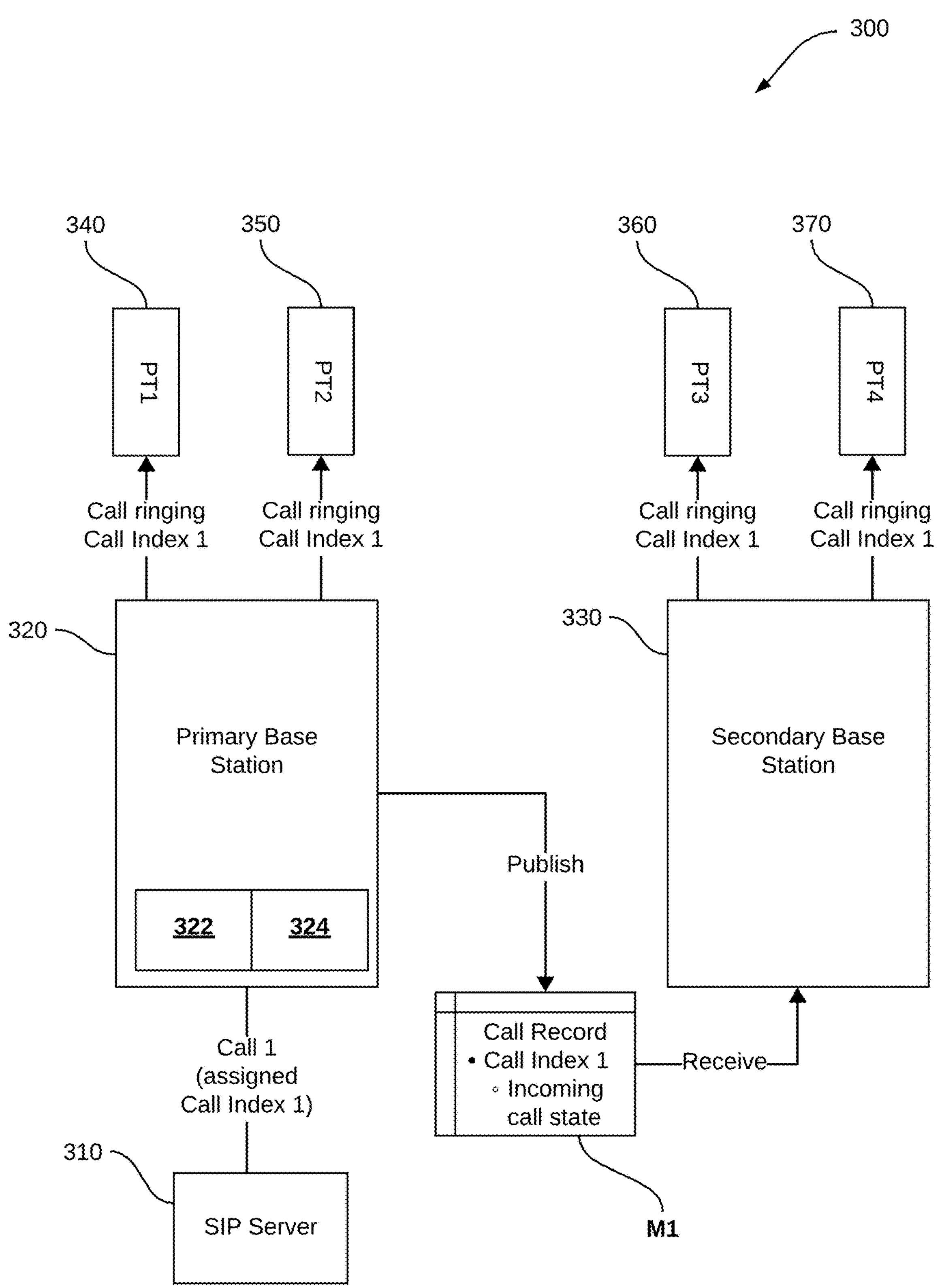
FIG. 4 depicts a block diagram of a multicell system for emulating a shared or key line system in a multicell wireless network, according to an example embodiment.

FIG. 4 depicts a block diagram of a multicell system 300 for emulating a shared or key line system in a multicell wireless network, according to an example embodiment. In the example of FIG. 4, a single incoming call is handled so as to emulate a shared or key line system, such that the incoming call is placed on its own shared or key line. The system 300 of FIG. 4 includes SIP server 310, primary base 320, and secondary base 330. Portable terminals or wireless terminals 340, 350 are presently localized to the primary base 320, while terminals 360, 370 are presently localized to the secondary base 330. Other embodiments can include more secondary bases with terminals respectively localized to them. The various components shown in FIG. 4, such as the primary base 320, the secondary base(s) 330, and terminals 340, 350, 360, 370, may be similar to the primary base, secondary bases, and terminals shown in FIGS. 1-3.

Primary base 320 and secondary base 330 of FIG. 4 each include one or more processors (not shown in FIG. 4) and a memory (also not shown in FIG. 4) operatively coupled to the at least one processor. The memory includes instructions that, when executed, cause the at least one processor to perform the methods described herein. The processor may be one or more central processing units (CPUs), semiconductor-based microprocessors, and/or other hardware devices suitable for retrieval and execution of instructions stored in machine-readable storage medium. The processor may fetch, decode, and execute instructions for performing methods in accordance with the disclosure. As an alternative or in addition to retrieving and executing instructions, the processor may include one or more electronic circuits that include electronic components for performing the functionality of one or more instructions, such as a field programmable gate array (FPGA), application specific integrated circuit (ASIC), or other electronic circuits.

In the system 300 of FIG. 4, an incoming call ("Call 1") comes in to the primary base 320 through the SIP server 310. Call assign module 322 in the primary base 320 assigns a call index ("Call Index 1") to Call 1 in order to identify the call on a shared line. The call index may be, for example, a value or identifier made up of some combination of numbers, letters, symbols, etc. The primary base 320 stores the assigned call index ("Call Index 1") in call assign database 324. The call assign database 324 is accessible by the primary base 320 and any secondary base 330. In an embodiment, when the primary base 320 stores information into the call assign database 324, the information is propagated to all of the secondary bases of the site (i.e., system). As a result, every base station in the system has this information.

The call assign module 322 prepares a call record for the incoming call ("Call 1"). The call record includes the call index ("Call Index 1") that has been assigned to the call ("Call 1"). The call record also includes the call status of the call or an incoming call state. The call record is stored in the call assign database 324.

The call assign module 322 prepares a site database call record message M1 that contains the call record pertaining to the incoming call ("Call 1"). The primary base 320 distributes or publishes the call record message M1 to the secondary base 330. This is done to notify the secondary base 330 of the incoming call ("Call 1") with its assigned call index ("Call Index 1").

The primary base 320 and the secondary base 330 broadcast the call index ("Call Index 1") and the call status of the call to wireless terminals assigned to the shared line. For example, the primary base 320 rings localized terminals 340, 350 with the call index ("Call Index 1") and the call status of the call, and the secondary base 330 rings localized terminals 360, 370 with the call index ("Call Index 1") and call status of the call.

Each terminal assigned to the shared line can display the call index and the call status of a call. Any terminal on the shared line is enabled to answer the call and utilize available shared call operations using the call index. Any or all of the terminals assigned to the shared line can be rung.

The primary base 320 is therefore enabled to perform one or more call operations relating to the call based on operation requests from terminals assigned to the shared line. Each operation request includes the call index of the first call so that the primary base 320 can identify the call. When the call ends, the call assign module 322 can release the call index to make it available for future calls.

Accordingly, the system 300 is enabled to emulate a shared or key line system in a multicell wireless network so that a single incoming call coming into the multicell network can effectively be placed on its own shared or key line. It is noted that while Call 1 in this example is an incoming call, Call 1 could also be an outgoing call. Other calls (Call 2, Call 3, etc.), incoming or outgoing, would be handled in a similar fashion.

Figure 5:
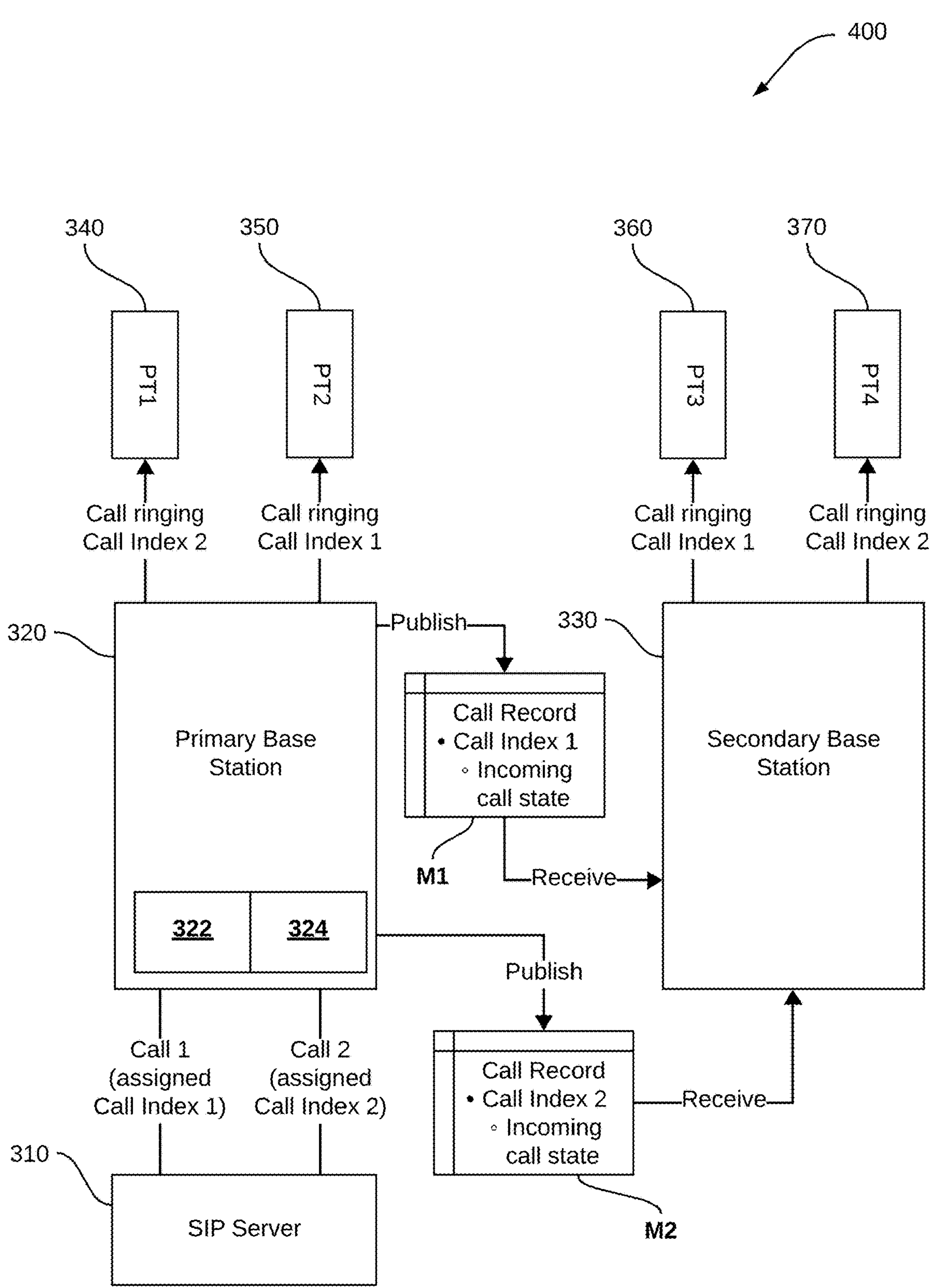
FIG. 5 depicts a block diagram of a multicell system for emulating a shared or key line system in a multicell wireless network, according to another example embodiment.

FIG. 5 depicts a block diagram of a multicell system 400 for emulating a shared or key line system in a multicell wireless network, according to another example embodiment. In the example of FIG. 5, multiple incoming calls are handled so as to emulate a shared or key line system, such that each incoming call is placed on a respective shared line. The multiple incoming calls in this example are concurrent calls. The system 400 of FIG. 5 includes SIP server 310, primary base 320, and secondary base 330. Portable terminals or wireless terminals 340, 350 are presently localized to the primary base 320, while terminals 360, 370 are presently localized to the secondary base 330. Other embodiments can include more secondary bases with terminals respectively localized to them. The various components shown in FIG. 5 such as the primary base 320, the secondary base(s) 330, and terminals 340, 350, 360, 370 may be similar to like components of FIG. 4, and also may be similar to the primary base, secondary bases, and terminals shown in FIGS. 1-3.

In the system 400 of FIG. 5, a first incoming call ("Call 1") comes in to the primary base 320 through the SIP server 310. A second incoming call ("Call 2") also comes in to the primary base 320 through the SIP server 310.

The call assign module 322 in the primary base 320 assigns a call index ("Call Index 1") to Call 1 in order to identify Call 1 on a shared line. The call index may be, for example, a value or identifier made up of some combination of numbers, letters, symbols, etc. The primary base 320 stores the assigned call index ("Call Index 1") in the call assign database 324 which is accessible by the primary base 320 and the secondary base 330.

The call assign module 322 also assigns a call index ("Call Index 2") to Call 2 in order to separately identify Call 2 on a separate shared line. The primary base 320 stores the call index assigned to Call 2 ("Call Index 2") in the call assign database 324.

The call assign module 322 prepares a call record for the first incoming call ("Call 1"). The call record for Call 1 includes the call index ("Call Index 1") assigned to Call 1. The call record for Call 1 also includes the call status of the call or an incoming call state. The call assign module 322 also prepares a call record for the second incoming call ("Call 2"). The call record for Call 2 includes the call index ("Call Index 2") assigned to Call 2. The call record for Call 2 also includes the call status of the call or an incoming call state. The call records are stored in the call assign database 324.

The call assign module 322 prepares a site database call record message M1 that contains the call record pertaining to Call 1. The call assign module 322 also prepares a site database call record message M2 that contains the call record pertaining to Call 2. The primary base 320 distributes or publishes the call record messages M1 and M2 to the secondary base 330. This is done to notify the secondary base 330 of the incoming calls ("Call 1" and "Call 2") with their respective assigned call indexes ("Call Index 1" and "Call Index 2").

The primary base 320 and the secondary base 330 broadcast the call indexes ("Call Index 1" and "Call Index 2") and the respective call status of each call to wireless terminals assigned to the respective shared lines. For example, the primary base 320 rings localized terminal 350 with Call Index 1 and the status of Call 1, and the secondary base 330 rings localized terminal 360 with Call Index 1 and the status of Call 1. Concurrently, the primary base 320 rings localized terminal 340 with Call Index 2 and the status of Call 2, and the secondary base 330 rings localized terminal 370 with Call Index 2 and the status of Call 2. Accordingly, terminals 350, 360 share a line and indicate ringing for Call Index 1, and terminals 340, 370 share a line and indicate ringing for Call Index 2.

Each terminal assigned to the respective shared lines can display the call index and call status of a respective call. Any terminal on a respective shared line is enabled to answer the call and utilize available shared call operations using the call index. Any or all of the terminals assigned to a respective shared line can be rung.

The primary base 320 is therefore enabled to perform one or more call operations relating to the respective calls based on operation requests from terminals assigned to the respective shared lines. Each operation request includes the call index of the respective call so that the primary base 320 can identify the call. When a call ends, the call assign module 322 can release the call index assigned to that call to make it available for future calls.

Accordingly, the system 400 is enabled to emulate a shared or key line system in a multicell wireless network so that multiple concurrent calls coming into the multicell network can effectively be placed on their own shared or key lines. It is noted that while Calls 1 and 2 in this example are incoming calls, Call 1 and/or Call 2 could be an outgoing call. Other concurrent calls (Call 3, Call 4, etc.), incoming or outgoing, can be handled in a similar fashion.

Figure 6:
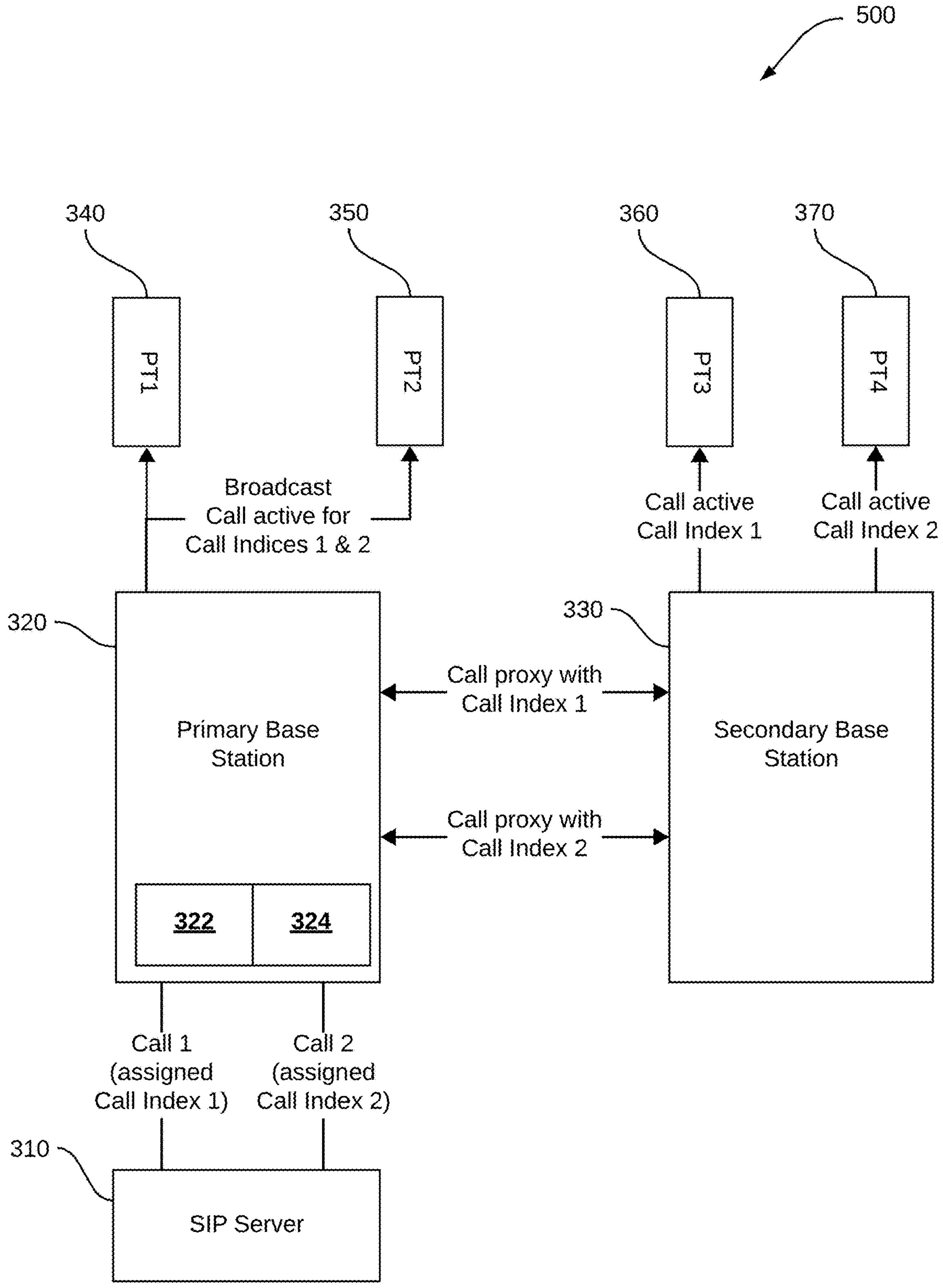
FIG. 6 depicts a block diagram of a multicell system for emulating a shared or key line system in a multicell wireless network, according to another example embodiment.

FIG. 6 depicts a block diagram of a multicell system 500 for emulating a shared or key line system in a multicell wireless network, according to another example embodiment. In the example of FIG. 6, multiple active calls are handled so as to emulate a shared or key line system, such that each active call is placed on a respective shared line. The multiple active calls in this example are concurrent calls. Each concurrent call is assigned a call index, which also identifies respective call proxies. When a terminal localized to the secondary base is on an active call, a call proxy is needed and is established between the primary and secondary bases. This call proxy is routed with the actual call, the call leg with the SIP server. The call proxy and the actual call are matched up based on the call index.

In the example shown in FIG. 6, two concurrent call proxies between the primary and secondary bases are identified by respective call indexes. The system 500 of FIG. 6 includes SIP server 310, primary base 320, and secondary base 330. Other embodiments can include more secondary bases with terminals respectively localized to them. The various components shown in FIG. 6 such as the primary base 320, the secondary base(s) 330, and terminals 340, 350, 360, 370 may be similar to like components of FIGS. 4 and 5, and also may be similar to the primary base, secondary bases, and terminals shown in FIGS. 1-3.

In the system 500 of FIG. 6, a first incoming call ("Call 1") comes in to the primary base 320 through the SIP server 310. A second incoming call ("Call 2") also comes in to the primary base 320 through the SIP server 310.

The call assign module 322 in the primary base 320 assigns a call index ("Call Index 1") to Call 1 in order to identify Call 1 on a shared line. The call index may be, for example, a value or identifier made up of some combination of numbers, letters, symbols, etc. When Call 1 is active with a terminal localized to the secondary base 320, the call assign module 322 also assigns/identifies a call proxy ("Call Proxy 1") with Call Index 1. The primary base 320 stores the assigned call index ("Call Index 1") in the call assign database 324 which is accessible by the primary base 320 and the secondary base 330. Accordingly, Call Index 1 identifies both Call 1 and Call Proxy 1.

The call assign module 322 also assigns a call index ("Call Index 2") to Call 2 in order to separately identify Call 2 on a shared line. When Call 2 is active with a terminal localized to the secondary base station, the call assign module 322 also assigns/identifies a call proxy ("Call Proxy 2") with Call Index 2. The primary base 320 stores the call index assigned to Call 2 ("Call Index 2") in the call assign database 324. Accordingly, Call Index 2 identifies both Call 2 and Call Proxy 2. A call proxy for Call Proxy 2 is established between the primary base 320 and the secondary base 330.

Thus, two concurrent call proxies between the primary base 320 and the secondary base 330 are established and identified by Call Index 1 and Call Index 2. Each call proxy and its corresponding actual call are matched up based on the respective call index. Thus, Call Proxy 1 and Call 1 are matched up based on Call Index 1, and Call Proxy 2 and Call 2 are matched up based on Call Index 2.

The primary base 320 broadcasts the call active state for Call Indices 1 and 2 to terminals 340, 350. The secondary base 330 broadcasts the call active state for Call Index 1 to terminal 360, and broadcasts the call active state for Call Index 2 to terminal 370. Accordingly, the call active states associated with Call Index 1 and Call Index 2 are broadcast to all the terminals, and displayed for the user. A call active state can be broadcast to any or all of the terminals and displayed thereon.

Accordingly, when a portable terminal at the secondary base 320 is on an active call, a call proxy is established between the primary base 320 and the secondary base 330. This call proxy is routed with the actual call. The call proxy and the actual call are matched up based on the call index.

Each terminal assigned to the respective shared lines can display the call index and call proxy of a respective call. Any terminal on a respective shared line is enabled to answer the call and utilize available shared call operations using the call index and the call proxy. Any or all of the terminals assigned to a respective shared line can be rung.

The primary base 320 is therefore enabled to perform one or more call operations relating to the respective active calls based on operation requests from terminals assigned to the respective shared lines. Each operation request includes the call index and call proxy of the respective call so that the primary base 320 can identify the call. When a call ends, the call assign module 322 can release the call index assigned to that call to make it available for future calls.

Thus, the system 500 of FIG. 6 establishes call proxies, when the first call and the second call are active with wireless terminals localized to the at least one secondary base station, the call proxies including a call proxy between the primary base station and the at least one secondary base station for the first call and a call proxy between the primary base station and the at least one secondary base station for the second call. The system matches the call proxies with the first call and the second call based at least in part on the call index of the first call and the call index of the second call, respectively. A call active state is broadcast to and displayed on all of the terminals.

Accordingly, the system 500 is enabled to emulate a shared or key line system in a multicell wireless network so that multiple active calls coming into the multicell network can effectively be placed on their own shared or key lines. It is noted that while Calls 1 and 2 in this example are incoming calls, Call 1 and/or Call 2 could be an outgoing call. Other active calls (Call 3, Call 4, etc.), incoming or outgoing, can be handled in a similar fashion.

Figure 7:
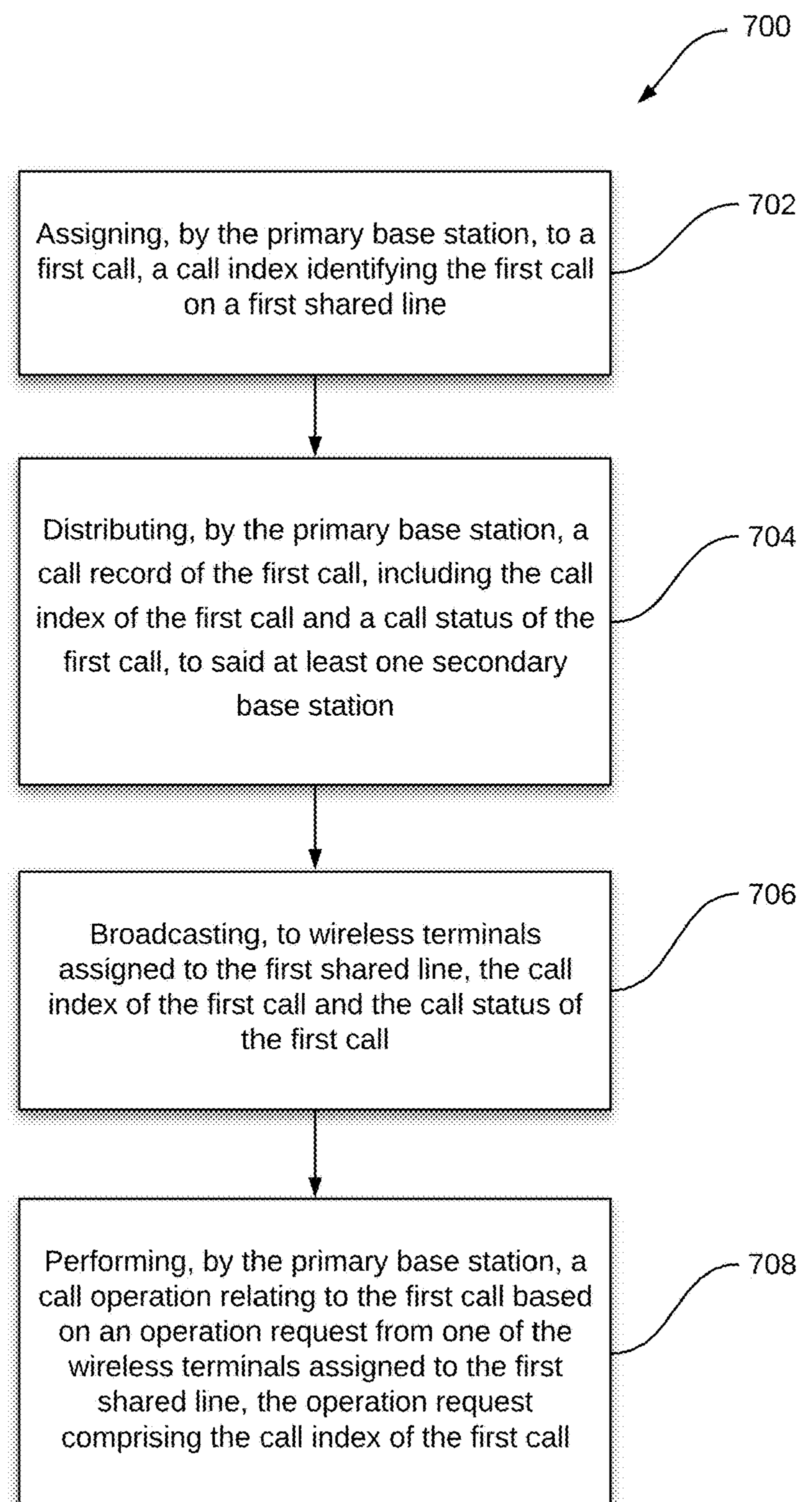
FIG. 7 is a flowchart of a method for emulating a shared or key line system in a multicell wireless network comprising a primary base station in communication with at least one secondary base station, according to an example embodiment.

FIG. 7 is a flowchart of a method 700 for emulating a shared or key line system in a multicell wireless network comprising a primary base station in communication with at least one secondary base station. The network may be the network shown in the example embodiments of FIGS. 4-6, in which the network comprises a primary base station 320 and one or more secondary base stations 330 which communicate with wireless terminals 340, 350, 360, 370. In example embodiments, the method 700 may be performed using the call assign module 322 in conjunction with call assign database 324, as shown in FIGS. 3-6.

The method 700 includes assigning (702), by the primary base 320, to a first call, a call index identifying the first call on a first shared line. More specifically, a call assign module of the primary base 320, such as call assign module 322, may assign the call index. As an example, the first call may be denoted "Call 1" and the assigned call index may be "Call Index 1." The call index may be for example, a value or identifier made up of some combination of numbers, letters, symbols. The assigned call index may be stored in a call assign database such as call assign database 324 which is accessible to any secondary base 330. The first call may be an incoming call or an outgoing call.

The method 700 also includes distributing (704), by the primary base 320, a call record of the first call, including the call index of the first call and a call status of the first call, to the at least one secondary base 330. The call record may be prepared by the call assign module 322 and may be stored in the call assign database 324. The call record may be distributed by publishing a site database call record message (e.g., "M1") that includes the call record.

The method 700 also includes broadcasting (706), to wireless terminals assigned to the first shared line, the call index of the first call and the call status of the first call. Each terminal assigned to the shared line can display the call index and the call status of a call. Any terminal on the shared line is enabled to answer the call and utilize available shared call operations using the call index. Any or all of the terminals assigned to the shared line can be rung with the call index.

The method 700 also includes performing (708), by the primary base 320, a call operation relating to the first call based on an operation request from one of the wireless terminals assigned to the first shared line. The operation request includes the call index of the first call. The call index may be released when the first call ends.

Accordingly, the method 700 is enabled to emulate a shared or key line system in a multicell wireless network so that a single incoming call coming into the multicell network can effectively be placed on its own shared or key line.

In embodiments the method 700 may further include assigning, by the primary base 320, to a second call ("Call 2"), a call index ("Call Index 2") identifying the second call on a second shared line; distributing, by the primary base 320, a call record of the second call, including the call index of the second call and a call status of the second call, to the at least one secondary base station 330; broadcasting, to the wireless terminals assigned to the second shared line, the call index of the second call and the call status of the second call; and performing a call operation, by the primary base station 320, based on an operation request relating to the second call, from one of the wireless terminals assigned to the second shared line. The operation request includes the call index of the second call.

In embodiments the method 700 may further include establishing, when the first call is active with a wireless terminal localized to the at least one secondary base 330, a call proxy ("Call Proxy 1") between the primary base 320 and the at least one secondary base 330, and matching the call proxy with the first call based at least in part on the call index of the first call. The method 700 may further include broadcasting a call active state to all of the wireless terminals. The call active state can be displayed on the wireless terminals.

In embodiments the method may further include establishing call proxies when the first call and the second call are active with wireless terminals localized to the at least one secondary base station, the call proxies including a call proxy between the primary base station and the at least one secondary base station for the first call ("Call Proxy 1") and a call proxy between the primary base station and the at least one secondary base station for the second call ("Call Proxy 2"). The call proxies are matched with the first call and the second call based at least in part on the call index of the first call and the call index of the second call, respectively.

Accordingly, as described above, systems and methods are disclosed for emulating a shared line system in a multicell wireless network comprising a primary base in communication with at least one secondary base, the network providing communication with wireless terminals. In example embodiments, for any new incoming or outgoing call on a shared line, the primary base assigns a free call index. This call index identifies the shared line call for the duration of the call. When the call ends, the call index is freed. For the new call, the primary base publishes/distributes a call record, which includes the call index and the call status, to all secondary bases in the system. All bases in the system broadcast the call index and call status to the portable terminals for display.

The call index enables the user to select the call for shared call operations, for example barging-in or others. A shared call operation request is accompanied with the call index, and the primary base performs one or more requests containing the same call index. For example, if two portable terminals direct to unhold the same call, then the primary base only allows one of the unhold requests to succeed. When a portable terminal at the secondary base is on an active call, a call proxy is needed between the primary and secondary base. This call proxy is routed with the actual call, the call leg with the SIP server. The call proxy and actual call are matched up based on the call index.

Figure 8:
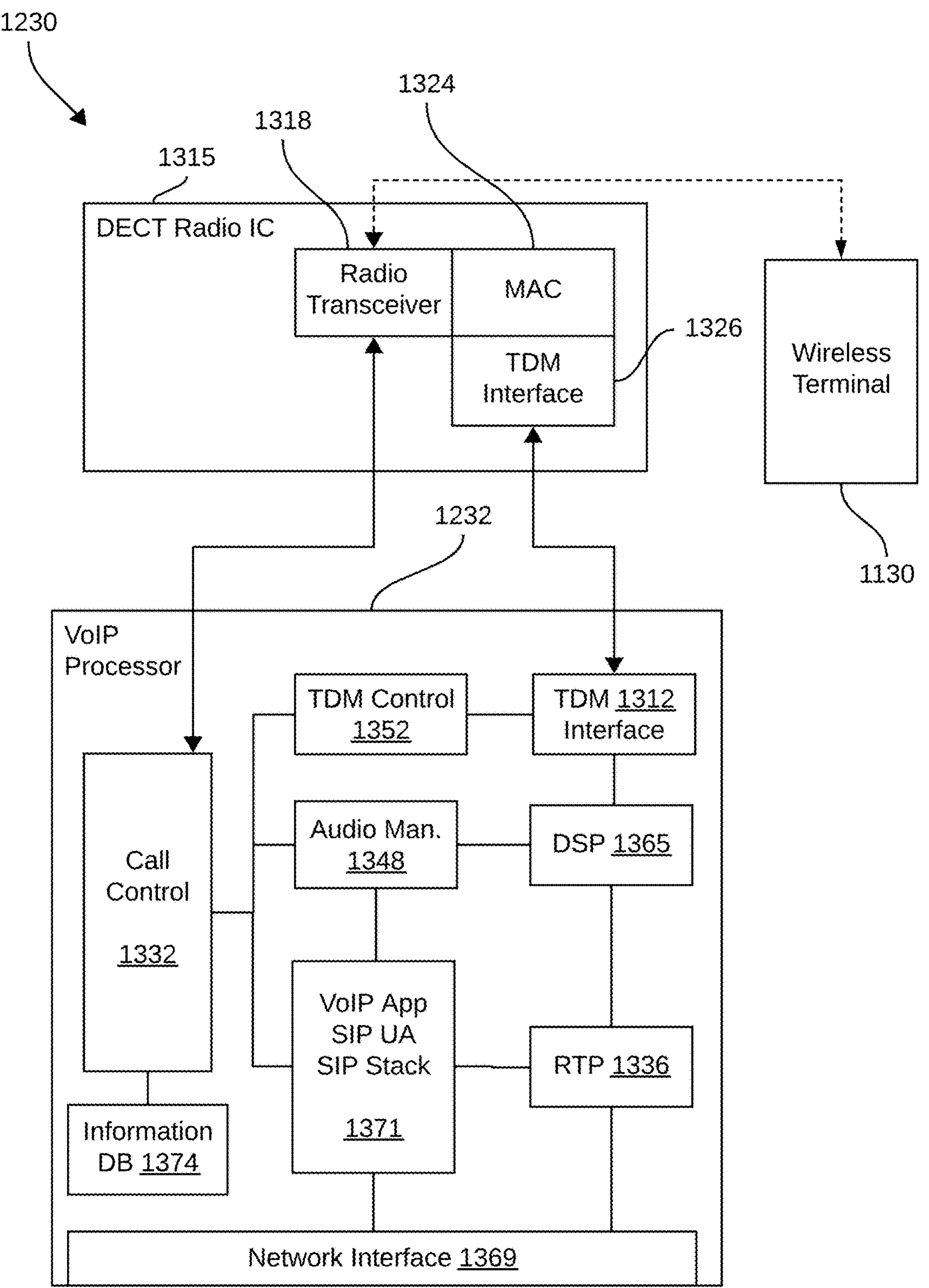
FIG. 8 depicts a base station of a multicell DECT system in which a call is established between a wireless terminal localized to the base station.

FIG. 8 depicts a base station 1230 of a multicell DECT system in which a call is established between a wireless terminal 1130 localized to the base station 1230. The base station 1230 includes a radio integrated circuit (IC) 1315 which handles the wireless radio frequency (RF) communication between the DECT base station and the DECT handsets e.g., wireless terminal 1130. The radio IC 1315 includes a radio transceiver 1318 which handles the physical transmission and reception of RF signals, modulates the digital data to be transmitted wirelessly via RF signals, and demodulates received RF signals to retrieve the received digital data.

The radio IC 1315 includes a medium access control (MAC) module 1324, which is responsible for managing the Time Division Multiple Access (TDMA) time slots and ensuring that each device (e.g., base station or handset) transmits or receives in its allocated time, avoiding collisions. DECT allows for multiple parallel communications, such as voice, data, and control signals, over the same channel. The MAC module 1324 handles the multiplexing of these different types of communication into the TDMA structure.

In the radio IC 1315 the MAC module 1324 is in communication with the radio IC end of a Time Division Multiplexing (TDM) interface 1326 which functionally connects the radio IC to the VoIP processor 1232 of the base station 1230 via the VoIP end of the TDM interface 1312. The data input and output by the VoIP end of the TDM interface 1312 is processed by other components of the VoIP processor 1232, as discussed in further detail below.

The VoIP processor 1232 includes a network interface 1369 for connecting to IP-based networks, e.g., local area networks and the Internet. Additionally, as discussed above, the base station 1230 has a Call Control 1332 for controlling the VoIP processor and other functions of the base station.

The Call Control 1332 interacts with an information database 1374 responsible for storing call-related information, such as SIP data. The information database 1374 may also form part of a shared database within the multicell system. For example, the database 1374 may store and share status information with other databases in other base stations within the multicell system in real-time. The status information may include information such as the base station to which a wireless terminal is currently localized.

The Call Control 1332 interacts with a Voice over Internet Protocol application (VOIP APP) 1371, which handles call setup, management, and termination. Specifically, the VoIP application 1371 handles signaling protocols, such as Session Initiation Protocol (SIP), to establish, manage, and terminate calls over the IP network. For example, the VoIP application sends and receives signaling messages, such as INVITE, ACK, BYE, etc. The VoIP application 1371 is also responsible for the Real-time Transport Protocol (RTP) streams, including packetizing the voice data, handling sequence numbering, timestamping, etc.

The base station 1230 further includes one or more processors, including, for example, the call control 1332 (discussed above), the TDM Control 1352 which interacts within the VoIP end of the TDM Interface 1326 (discussed above) to control time division multiplexing and demultiplexing, and the digital signal processor (DSP) 1365 which handles processing digital signals. These processors may be implemented separately, as depicted in FIG. 8, or may be integrated in various combinations, such as in a single (or a few) processors and/or integrated circuits. One or more of these processors may be used to execute, at least in part, methods disclosed herein.

The base station 1230 may include an RTP module 1336, which is responsible for handling real time protocol (RTP) packets and real time protocol control (RTCP) packets. The base station 1230 may also include an Audio Manager 1348 for handling audio packets extracted from RTP streams.

Although examples herein describe DECT systems and methods, disclosed embodiments may encompass or relate to telecommunications systems and methods that use other types of wireless communication or other wireless protocols.

The claimed software elements can be realized on a variety of telecommunications systems or subsystems. The following description, in conjunction with the disclosed embodiments described in the foregoing, provides representative, non-limiting examples of potential telecommunications systems or subsystems that could be used to execute the claimed software elements.

At a high level, a telecommunications system or subsystem typically includes, but is not limited to, communication devices, networks, base stations, servers, and a variety of other hardware and software components. Communication devices may include a broad range of devices such as cordless telephones, mobile phones, smartphones, computers, tablets, and other types of devices capable of sending and receiving communication signals. These devices usually include at least one processor, memory, a user interface (such as a display, keyboard, or touch screen), and a network interface for connecting to a network.

The network component of a telecommunications system or subsystem can take various forms, including multicell systems, e.g., Digital Enhanced Cordless Telecommunications (DECT), public switched telephone networks (PSTN), the Internet, mobile networks (e.g., 3G, 4G, 5G), local area networks (LAN), wide area networks (WAN), and others. Base stations and/or servers are also commonly part of telecommunications systems, facilitating the storage, processing, and exchange of data. Like the aforementioned communication devices, these elements generally include a processor and memory for executing software applications, as well as network interfaces for communicating with the network and other devices.

Software elements in the telecommunications system may include operating systems, device drivers, networking software, applications, and other types of software. These software elements can be executed on communication devices, base stations, servers, or other hardware components of the telecommunications systems or subsystems. The claimed software elements may be embodied as computer program code that is executed on one or more of the hardware components of the telecommunications system or subsystem. This code could be stored on a non-transitory computer-readable medium that is part of the communication device, base station, server, or other component, or it could be stored on an external storage device, network storage, or cloud storage.

A computer-readable or machine-readable storage medium may be any electronic, magnetic, optical, or other physical storage device that contains or stores executable instructions. Such a medium may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 24 may be a non-transitory storage medium, where the term "non-transitory" does not encompass transitory propagating signals. A computer-readable or machine-readable medium may be encoded with executable instructions, for example, instructions for performing methods in accordance with the disclosure.

The foregoing detailed description has presented various implementations of the devices and/or processes through the use of block diagrams, schematics, and illustrative examples. As such block diagrams, schematics, and examples include one or more functions and/or operations, it should be understood by those skilled in the art that each function and/or operation within these block diagrams, flowcharts, or examples can be implemented individually and/or collectively by employing a wide range of hardware, software, firmware, or any combination thereof. It should also be recognized by those skilled in the art that the methods or algorithms described herein may incorporate additional steps, may exclude some steps, and/or may execute steps in an order different from the one specified. The various implementations described above can be combined to create additional implementations.

These modifications and other changes can be made to the implementations in light of the above-detailed description. Generally, the terms used in the following claims should not be construed to limit the claims to the specific implementations disclosed in the specification and the claims. Instead, they should be interpreted to encompass all possible implementations, along with the full scope of equivalents to which such claims are entitled. Consequently, the claims are not limited by the disclosure but are intended to cover all possible implementations within their scope.

What is claimed is:

1. A method for emulating a shared line system in a multi-cell wireless network comprising a primary base station in communication with at least one secondary base station, the network providing communication with wireless terminals, the method comprising:

assigning, by the primary base station, to a first call, a call index identifying the first call on a first shared line;

distributing, by the primary base station, a call record of the first call, including the call index of the first call and a call status of the first call, to said at least one secondary base station;

broadcasting, by at least one of the primary base station and said at least one secondary base station, to wireless terminals assigned to the first shared line, the call index of the first call and the call status of the first call; and performing, by the primary base station, a call operation relating to the first call based on an operation request from one of the wireless terminals assigned to the first shared line, the operation request comprising the call index of the first call.

2. The method of claim 1, further comprising:

establishing, when the first call is active with a wireless terminal localized to said at least one secondary base station, a call proxy between the primary base station and said at least one secondary base station; and matching the call proxy with the first call based at least in part on the call index of the first call.

3. The method of claim 1, further comprising:

assigning, by the primary base station, to a second call, a call index identifying the second call on a second shared line;

distributing, by the primary base station, a call record of the second call, including the call index of the second call and a call status of the second call, to said at least one secondary base station;

broadcasting, to the wireless terminals assigned to the second shared line, the call index of the second call and the call status of the second call; and performing a call operation, by the primary base station, based on an operation request, relating to the second call, from one of the wireless terminals assigned to the second shared line, the operation request comprising the call index of the second call.

4. The method of claim 3, further comprising:

establishing call proxies, when the first call and the second call are active with wireless terminals localized to said at least one secondary base station, the call proxies including a call proxy between the primary base station and said at least one secondary base station for the first call and a call proxy between the primary base station and said at least one secondary base station for the second call; and matching the call proxies with the first call and the second call based at least in part on the call index of the first call and the call index of the second call, respectively.

5. The method of claim 2, further comprising broadcasting a call active state to all of the wireless terminals.

6. The method of claim 1, wherein the call index is a value.

7. The method of claim 1, wherein each wireless terminal displays the call index and the call status.

8. The method of claim 1, wherein the distributing includes publishing a site database call record message that includes the call record.

9. The method of claim 1, wherein any wireless terminal is enabled to answer the call and utilize available shared call operations using the call index.

10. The method of claim 1, further comprising ringing with the call index all of the wireless terminals assigned to the first shared line.

11. The method of claim 1, wherein the first call is one of an incoming call or an outgoing call.

12. The method of claim 1, further comprising releasing the call index when the first call ends.

13. The method of claim 1, further comprising storing the call record in a database accessible by the primary and secondary base stations.

14. The method of claim 5, further comprising displaying, on the wireless terminals, the call active state.

15. A system for emulating a shared line system in a multicell wireless network, the network comprising a primary base station in communication with at least one secondary base station, the network providing communication with wireless terminals, the system comprising:

at least one processor; and memory operatively coupled to said at least one processor, the memory including instructions that, when executed, cause said at least one processor to perform:

assigning, by the primary base station, to a first call, a call index identifying the first call on a first shared line;

distributing, by the primary base station, a call record of the first call, including the call index of the first call and a call status of the first call, to said at least one secondary base station;

broadcasting, by at least one of the primary base station and said at least one secondary base station, to wireless terminals assigned to the first shared line, the call index of the first call and the call status of the first call; and performing, by the primary base station, a call operation relating to the first call based on an operation request from one of the wireless terminals assigned to the first shared line, the operation request comprising the call index of the first call.

16. The system of claim 15, wherein the memory further includes instructions that, when executed, cause said at least one processor to perform:

establishing, when the first call is active with a wireless terminal localized to said at least one secondary base station, a call proxy between the primary base station and said at least one secondary base station; and matching the call proxy with the first call based at least in part on the call index of the first call.

17. The system of claim 15, wherein the memory further includes instructions that, when executed, cause said at least one processor to perform:

assigning, by the primary base station, to a second call, a call index identifying the second call on a second shared line;

distributing, by the primary base station, a call record of the second call, including the call index of the second call and a call status of the second call, to said at least one secondary base station;

broadcasting, to the wireless terminals assigned to the second shared line, the call index of the second call and the call status of the second call; and performing a call operation, by the primary base station, based on an operation request, relating to the second call, from one of the wireless terminals assigned to the second shared line, the operation request comprising the call index of the second call.

18. The system of claim 17, wherein the memory further includes instructions that, when executed, cause said at least one processor to perform:

establishing call proxies, when the first call and the second call are active with wireless terminals localized to said at least one secondary base station, the call proxies including a call proxy between the primary base station and said at least one secondary base station for the first call and a call proxy between the primary base station and said at least one secondary base station for the second call; and matching the call proxies with the first call and the second call based at least in part on the call index of the first call and the call index of the second call, respectively.

19. The system of claim 16, wherein the memory further includes instructions that, when executed, cause said at least one processor to perform broadcasting a call active state to all of the wireless terminals.

20. A method for emulating a shared line system in a multicell wireless network, the network comprising a primary base station in communication with at least one secondary base station, the network providing communication with wireless terminals, the method comprising:

receiving by at least one secondary base station, from the primary base station, a call record of a first call, the call record including (1) a call index of the first call identifying the first call on a first shared line, and (2) a call status of the first call;

broadcasting, by the at least one secondary base station, to wireless terminals assigned to the first shared line, the call index of the first call and the call status of the first call; and sending, by the at least one secondary base station, to the primary base station, a call operation relating to the first call based on an operation request from one of the wireless terminals assigned to the first shared line, the operation request comprising the call index of the first call.

21. A system for emulating a shared line system in a multicell wireless network, the network comprising a primary base station in communication with at least one secondary base station, the network providing communication with wireless terminals, the system comprising:

at least one processor; and memory operatively coupled to said at least one processor, the memory including instructions that, when executed, cause said at least one processor to perform:

receiving by at least one secondary base station, from the primary base station, a call record of a first call, the call record including (1) a call index of the first call identifying the first call on a first shared line, and (2) a call status of the first call;

broadcasting, by the at least one secondary base station, to wireless terminals assigned to the first shared line, the call index of the first call and the call status of the first call; and sending, by the at least one secondary base station, to the primary base station, a call operation relating to the first call based on an operation request from one of the wireless terminals assigned to the first shared line, the operation request comprising the call index of the first call.

22. One or more non-transitory computer-readable storage media comprising instructions which, when executed by at least one processor, cause said at least one processor to carry out a method for emulating a shared line system in a multi-cell wireless network comprising a primary base station in communication with at least one secondary base station, the network providing communication with wireless terminals, the method comprising:

assigning, by the primary base station, to a first call, a call index identifying the first call on a first shared line;

distributing, by the primary base station, a call record of the first call, including the call index of the first call and a call status of the first call, to said at least one secondary base station;

broadcasting, by at least one of the primary base station and said at least one secondary base station, to wireless terminals assigned to the first shared line, the call index of the first call and the call status of the first call; and performing, by the primary base station, a call operation relating to the first call based on an operation request from one of the wireless terminals assigned to the first shared line, the operation request comprising the call index of the first call.

* * * * *